(12) United States Patent
Lundström (10) Patent No.: US 10,487,883 B2
(45) Date of Patent: Nov. 26, 2019

(54) DOG CLUTCH

(71) Applicant: BorgWarner Sweden AB, Landskrona (SE)

(72) Inventor: Bo Lundström, Glumslöv (SE)

(73) Assignee: BorgWarner Sweden AB, Landskrona (SE)

( * ) Notice: Subject to any disclaimer, the term of this patent is extended or adjusted under 35 U.S.C. 154(b) by 0 days.

(21) Appl. No.: 15/535,930

(22) PCT Filed: Dec. 14, 2015

(86) PCT No.: PCT/EP2015/079665
§ 371 (c)(1),
(2) Date: Jun. 14, 2017

(87) PCT Pub. No.: WO2016/096769
PCT Pub. Date: Jun. 23, 2016

(65) Prior Publication Data
US 2017/0363155 A1    Dec. 21, 2017

(30) Foreign Application Priority Data
Dec. 15, 2014 (SE) ........................... 1451546

(51) Int. Cl.
*F16D 11/14* (2006.01)
*F16D 23/12* (2006.01)
*F16D 11/00* (2006.01)

(52) U.S. Cl.
CPC ............. *F16D 11/14* (2013.01); *F16D 23/12* (2013.01); *F16D 2011/004* (2013.01); *F16D 2011/008* (2013.01)

(58) Field of Classification Search
CPC ................................................. F16D 2011/004
USPC ....................................................... 192/69.91
See application file for complete search history.

(56) References Cited

U.S. PATENT DOCUMENTS 3,651,907 A * 3/1972 Myer, Sr. ................ F16D 41/22
192/43
3,715,019 A * 2/1973 Heybourne ............. F16D 23/10
192/69.3
4,069,903 A * 1/1978 Clements ................ F16D 23/10
192/69.3
(Continued)

FOREIGN PATENT DOCUMENTS

DE          3904158 A1    8/1990
DE    102010039445 A1    2/2012
(Continued)

*Primary Examiner* — Mark A Manley
(74) *Attorney, Agent, or Firm* — BrooksGroup (57) ABSTRACT

A dog clutch comprises first (160) and second (170) drive shafts, the drive shafts being connectable to one another by a dual spline connector (150). The dual spline connector is movable along a longitudinal axis of the first (160) and second (170) drive shafts and is provided with an internal spline that mates with an external spline of the first drive shaft. The dual spline connector is further provided with an external spline that upon axial movement may be connected or disconnected to an internal spline of the second drive shaft. Either or both of the external spline of the dual spline connector and/or the internal spline of the second drive shaft is or are provided with means for allowing partial connection of the internal and external splines.

1 Claim, 6 Drawing Sheets

(56) References Cited

U.S. PATENT DOCUMENTS

| | | | | |
|---|---|---|---|---|
| 4,727,968 A * | 3/1988 | Chana | ................... | F16D 23/06 |
| | | | | 192/108 |
| 5,031,741 A * | 7/1991 | Otto | ..................... | B63H 23/30 |
| | | | | 192/69.3 |
| 6,286,379 B1 * | 9/2001 | Yester | .................. | F16H 63/304 |
| | | | | 475/204 |
| 2010/0282563 A1 | 11/2010 | Yoshimura et al. | | |
| 2014/0335992 A1 | 11/2014 | Lee et al. | | |

FOREIGN PATENT DOCUMENTS

| | | |
|---|---|---|
| DE | 102012216988 A1 | 4/2014 |
| GB | 542439 A | 1/1942 |

\* cited by examiner

DOG CLUTCH

This application claims the benefit of Swedish Application No. 1451546-4 filed Dec. 15, 2014 and PCT Application No. EP2015/079665 filed Dec. 14, 2015.

FIELD OF THE INVENTION

The present invention relates to a dog clutch comprising first and second drive shafts, the drive shafts being connectable to one another by a dual spline connector which is movable along a longitudinal axis of the first and second drive shafts. The dual spline connector is provided with an internal spline that mates with an external spline of the first drive shaft, the dual spline connector further being provided with an external spline that upon axial movement may be connected or disconnected to an internal spline of the second drive shaft.

PRIOR ART

Clutches are used to connect or disconnect a drive source, e.g. an engine, to a driving means, e.g. a drive shaft of a vehicle. There are two main types of clutches, namely friction clutches, which allows for a slip between the drive source and the driving means, and dog clutches, which are either connected or disconnected. Most dog clutches are designed with some kind of claws, often in the form of splines on a shaft, that may be engaged to a corresponding structure on another shaft. One problem with dog clutches is that they require the rotational speeds of the driving source and the driving means to be fairly equal; if not, the claws may not be engaged to the corresponding structure of the other shaft, since the claws will "bounce" on the corresponding structure they are supposed to engage with, without properly engaging for transferring the torque to be transferred.

One common field of use for dog clutches is in four wheel drive applications, where it is beneficial if it is possible to shift between two wheel drive and four wheel drive. This is performed by engaging or disengaging the engine from either driving the front wheels or the rear wheels.

One solution to the problem with engagement if the rotational speeds of the shafts to be connected are not equal is to design the dog clutch with a "slack", i.e. to increase the gaps of the corresponding structure. One problem with this solution is that the dog clutch may be "clonky", i.e. provide for a torque transfer interruption during torque shift from a negative to a positive torque or vice versa.

In DE 10 2012 216 988, a dog clutch wherein the claws are maximum half the size of the openings they are supposed to mate with are arranged with springs urging the claws to an extended position. If the rotational speeds of the shafts to be connected are different, the connection will start by one of the claws entering the opening with which it is supposed to mate, after which a neighboring claw also will enter the opening, hence creating a "clonk" free connection.

The solution according to DE 10 2012 216 988 is, however, complicated and costly to manufacture.

It is the object of the present invention to provide for a dog clutch that may be engaged if the rotational speeds of the shafts to be joined are different, while enabling for a clonk free connection.

SUMMARY OF THE INVENTION

The present invention solves, or at least mitigates, the problems of the prior art by providing a dog clutch wherein either or both of the external spline of the dual spline connector and/or the internal spline of the second drive shaft is or are provided with means for allowing partial connection of the internal and external splines.

In one embodiment of the invention, the means for allowing partial connection of the internal and external splines is a recess provided at an end of the spline that is arranged to contact a mating spline, wherein the recess comprises a torque transferring surface and a bottom surface.

In order to provide for best possible torque transfer, the torque transferring surface may have a shape corresponding to the spline it is arranged to contact.

In order not to reduce the torque transfer capability of the dog clutch when the internal and external splines are in full contact, the recess may be placed on a side of the spline being opposite to the side of the spline intended to transfer torque in a main direction.

In order to reduce the stroke necessary to connect/disconnect the dog clutch, both the internal splines and the external splines may be divided into at least two rows. In this embodiment, one of the spline rows may connect to its mating spline row earlier than the other spline row.

In order to allow for the partial connection, the splines of the spline row that will connect to its mating spline row earlier than the other spline row may be provided with thinner splines than the other spline row.

BRIEF DESCRIPTION OF THE DRAWINGS

In the following, the invention will be described with reference to the appended drawings, wherein.

DESCRIPTION OF EMBODIMENTS

Figure 1:
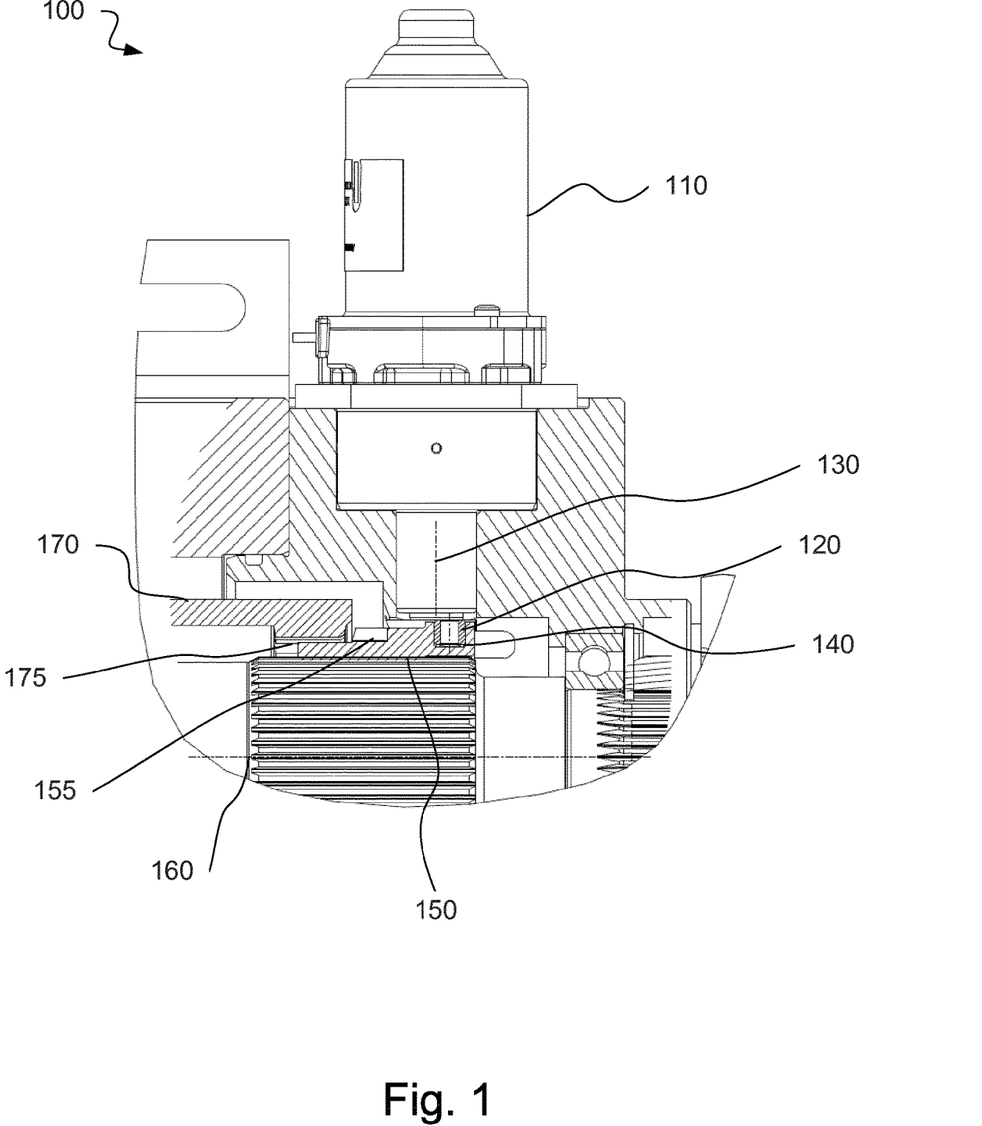
FIG. 1 is a section side view showing a part of a dog clutch according to the invention in a disconnected state.
Figure 2:
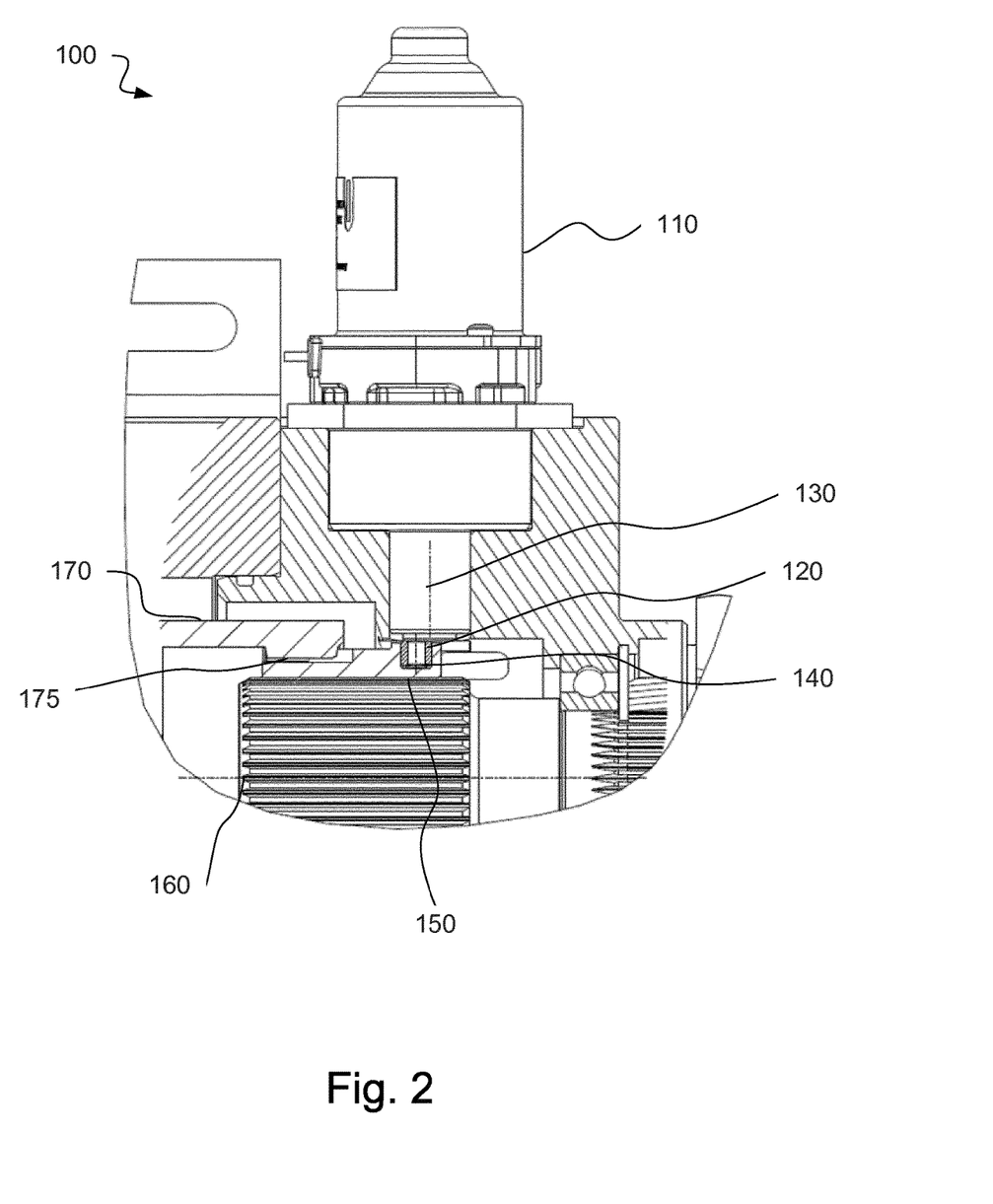
FIG. 2 is a section side view identical to the view of FIG. 1, but showing the dog clutch in a connected state.

With reference to FIGS. 1 and 2, a connection/disconnection arrangement 100 of a dog clutch is shown in a section view. The connection/disconnection arrangement 100 comprises a control unit 110, which is operable to rotate an excentrically disposed control pin 120 about a central axis 130. The control pin is further connected to a circumferential track 140 of a dual spline connector 150, which is longitudinally glidably mounted on a central splined drive shaft 160. An internal surface of the dual spline connector 150 is provided with internal splines mating with the splines of the splined drive shaft 160, such that the dual spline connector at all times corotate with the splined drive shaft, but as mentioned, it may glide in the longitudinal direction, i.e. along the length axis of the splined drive shaft.

Moreover, the dual spline connector is connectable to a second drive shaft 170. The second drive shaft is provided with an internal spline 175, and the dual spline connector 150 is provided with an external spline 155 that mates with the internal spline 175 of the second drive shaft 170.

In FIG. 1, the dog clutch is in the disconnected state. This is achieved by rotating the control unit 110 such that the pin 120 reaches its position to the right in FIG. 1. Due to the cooperation between the pin 120 and the track 140, the dual spline connector will be forced to the right in FIG. 1, away from the internal splines 175 of the second drive shaft 170.

In order to connect the splined drive shaft and the second drive shaft to one another, the control unit is controlled to rotate such that the pin 120, and consequently the dual spline connector 150, to the left. Then, the internal splines 175 of the second drive shaft and the external splines of the dual spline connector will engage, and the rotation of the splined drive shaft and the second drive shaft will be identical.

However, if there is an initial difference in the rotational velocities of the splined drive shaft and the second drive shaft, it might be difficult to engage the external spline 155 of the dual spline connector 150 and the internal spline 175 of the second drive shaft 170, simply because the time available for connection is when the internal and external splines are completely aligned.

According to the invention, this is solved by making the ends of either or both of the external and/or internal splines that first meet one another during a connecting operation asymmetric.

FIGS. 3a-3g show an exemplary first embodiment of a spline design for facilitating connection between the internal spline 175 and the external spline 155. As can be seen, the external splines are provided with a recess 157, which allows the splines to become partly engaged without being perfectly aligned. The recess provides a torque transferring surface 158 and a bottom surface 159, the torque transferring surface 158 having a shape adapted to provide for an as large surface area as possible contacting the internal spline 175. It should be noted that the recess 157 preferably is located on the side of the spline that does not transfer force to its mating spline. Moreover, is preferred if the bottom surface 158 is fairly flat. FIGS. 3a-3g show a connection sequence for a situation wherein the rotational speed of the splines 155 is initially higher than the rotational speed of the internal splines 175.

Figure 3A:
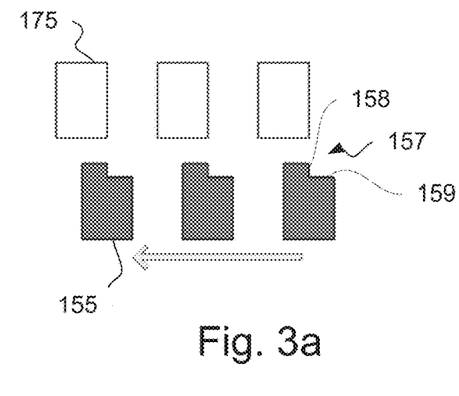
FIGS. 3a-3g are schematic top views showing first embodiment of a sequence of spline connection in case where one of the shafts to be connected rotates with a higher speed than the other shaft.

In FIG. 3a, the splines are completely disconnected.

Figure 3B:
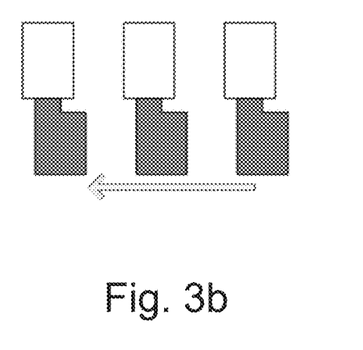

In FIG. 3b, the control unit is controlled to rotate, such that the splines start to contact. As can be seen, the splines do not lock to one another, since they are not aligned.

Figure 3C:
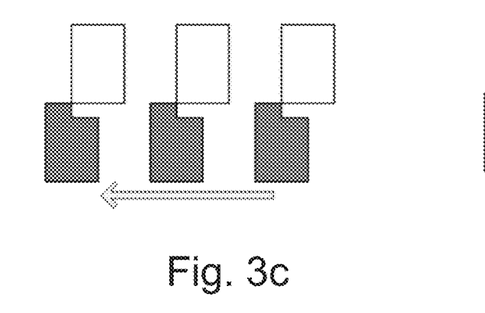

In FIG. 3c, it is shown how the splines 155 have moved relative the splines 175 such that the splines 175 are aligned to the recess 157.

Figure 3D:
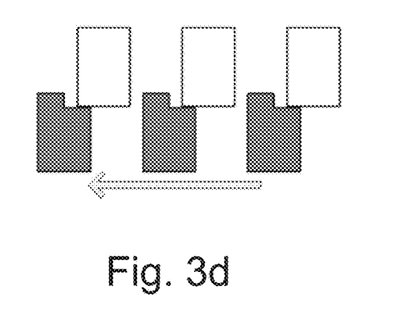

In FIG. 3d, the connection between the splines has been initiated by the splines 175 entering the recesses 157.

Figure 3E:
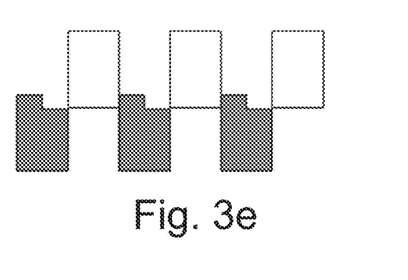

In FIG. 3e, the splines are completely aligned, and the spline 155 is locked to the spline 175 in one direction. The rotational speeds of the splines are now identical, and the splines are aligned.

Figure 3F:
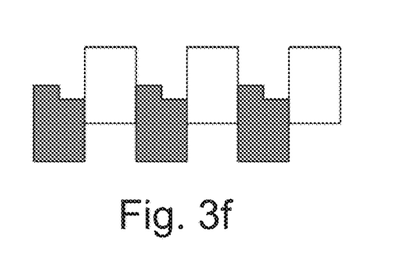
Figure 3G:
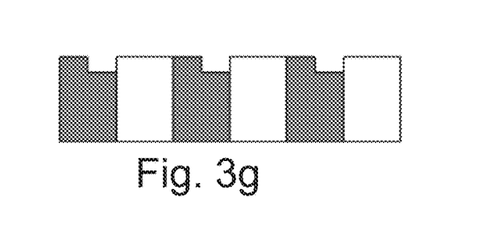

In FIGS. 3f and 3g, the alignment of the splines 155 and 175 allows the splines of engage completely.

It should be noted that the recesses 157 allow for the initial engagement of the splines—if it would not be present, the time of alignment between the splines would be too short for the splines to engage properly.

Figure 4A:
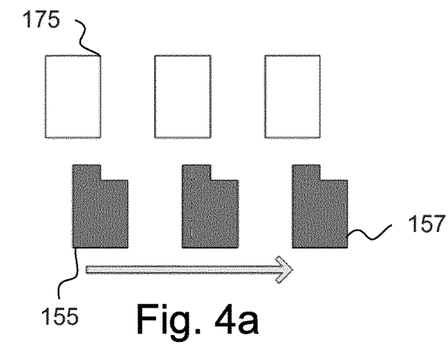
FIGS. 4a-4h are schematic top views showing first embodiment of a sequence of spline connection in case where the respective rotational speeds of the shafts are the opposite.
Figure 4B:
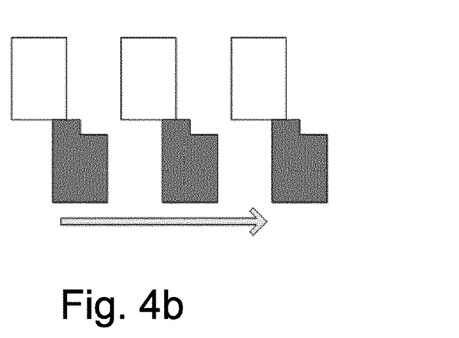
Figure 4C:
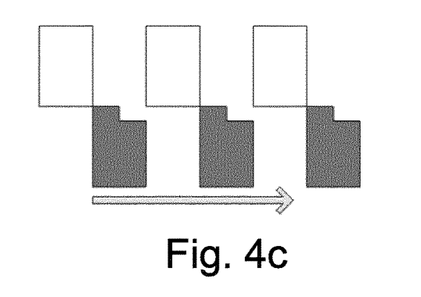
Figure 4D:
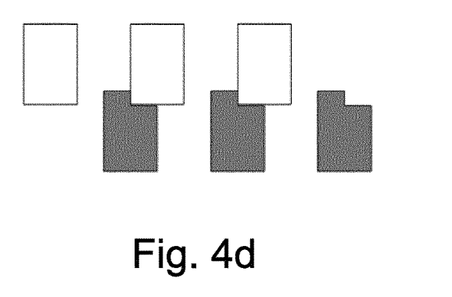

In FIGS. 4a-4c, a connection sequence for the opposite rotational speed difference of the splines 155 and 175 is shown, i.e. when the rotational speed being lower for the splines 155. The sequence of events for FIGS. 4a-4c is identical to the sequence of events for FIGS. 3a-3c, but then it differs slightly:

In FIG. 4d, the splines have been aligned, but instead of engagement between the splines 155 and 175, there will be an engagement between the recess 157 and the spline 175. This engagement will make the splines corotate with the same speed, but since the splines are not aligned, the connection will not be complete, like it is in FIGS. 3f and 3g. Please note, that in this position, it is preferred if the area of the recess that is in torque transferring contact with the spline 175 has a shape corresponding to the spline 155 that is not in torque transferring contact with the spline 175.

Figure 4E:
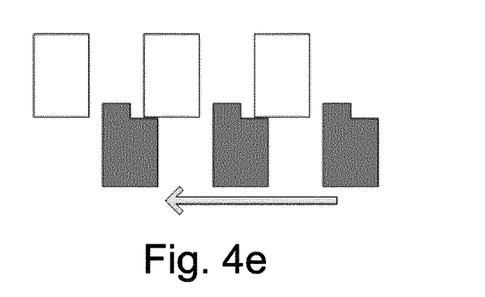
Figure 4F:
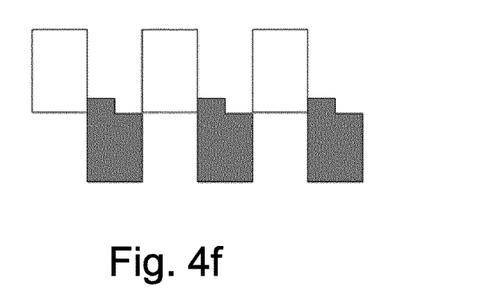
Figure 4G:
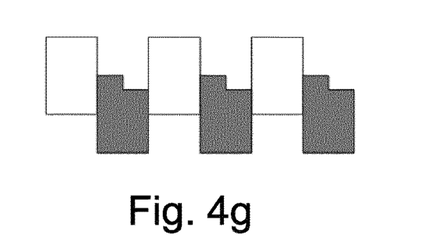
Figure 4H:
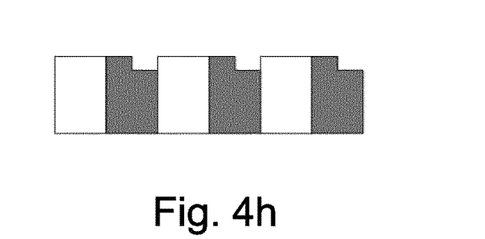

However, sooner or late, there will be a shift in the torque transfer between the splines. This is shown in FIG. 4e, and results in the rotational difference being identical to the difference in rotational speed according to FIGS. 3a-3d. The resulting complete engagement is shown in FIGS. 4f-4h, and is identical to the sequence shown in FIGS. 3e-3g.

It is preferred if this position is limited to use in situations where the torque transferred by the dog clutch is limited, e.g. in the direction wherein engine brake rather than engine drive is present.

In FIGS. 5a-5g, another embodiment of the spline arrangement is shown. Rather than having a recess 157 in the end of the spline that first contacts the spline to which it shall be connected, there are two rows 180, 185 and 190, 195 of splines, wherein the row 195 performs the same task as the end of the spline provided with the recess 157 of FIGS. 3 and 4. Below, a description of the functionality will be given.

First, the functionality where the spline rows 190 and 195 rotate with a higher rotational speed than the spline rows 180 and 185.

Figures 5A, 5B:
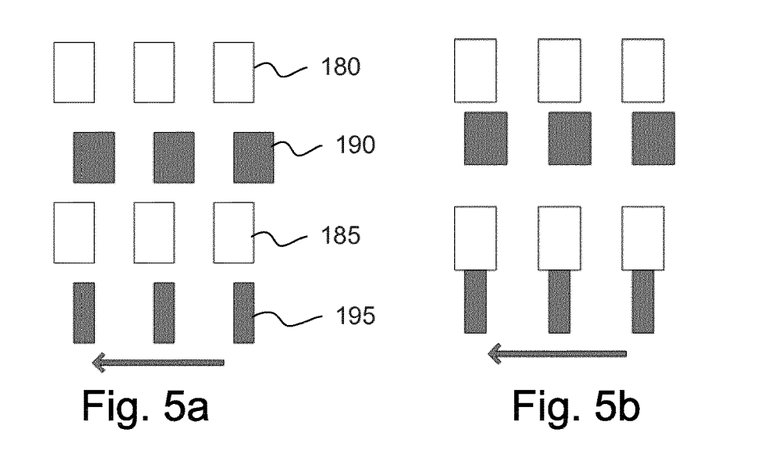
FIGS. 5a-5g are schematic views of a second embodiment of a sequence of spline connection where the rotational speed difference is identical to the speed difference of FIGS. 3a-3g.

In FIG. 5a, the dog clutch is completely disconnected.

In FIG. 5b, the control unit has started to actuate the dual spline connector, but the spline row 195 engages the spline row 185, such that no rotational connection between the spline rows will occur (compare the situation of FIGS. 3b and 4b).

Figure 5C:
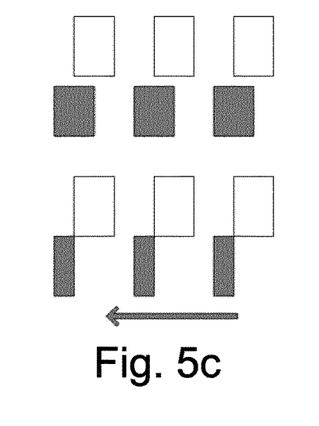
Figure 5D:
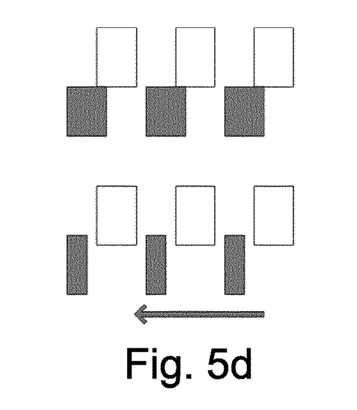
Figure 5E:
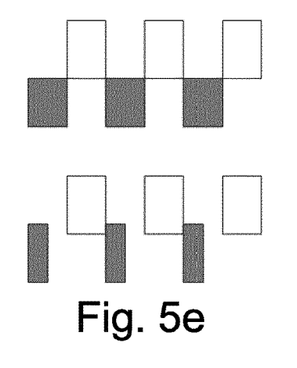
Figure 5F:
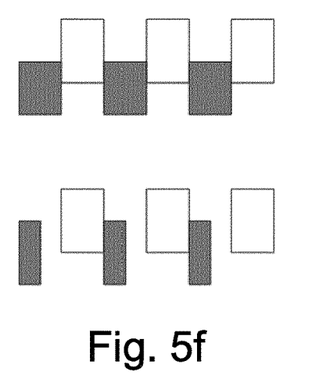
Figure 5G:
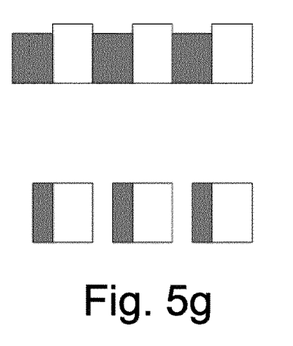
Figure 6A:
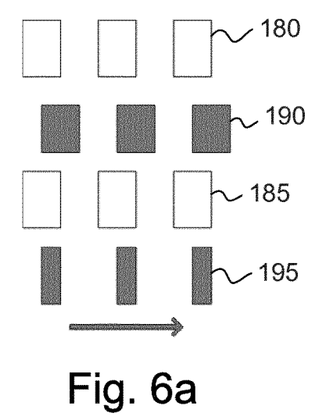
FIGS. 6a-6i are schematic views of a second embodiment of a sequence of spline connection where the respective rotational speeds of the shafts are the opposite, i.e. identical to the speed difference of FIGS. 4a-4h.
Figure 6B:
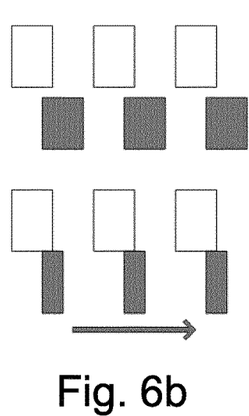
Figure 6C:
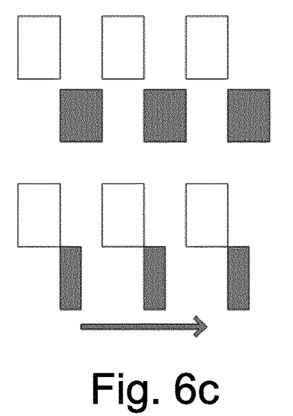
Figure 6D:
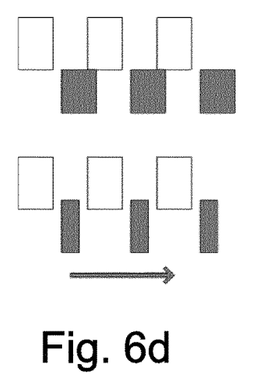
Figure 6E:
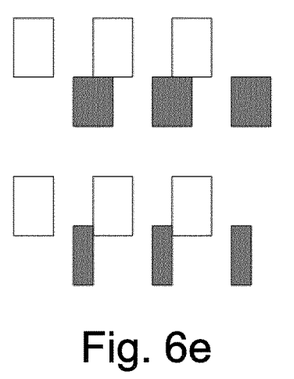
Figure 6F:
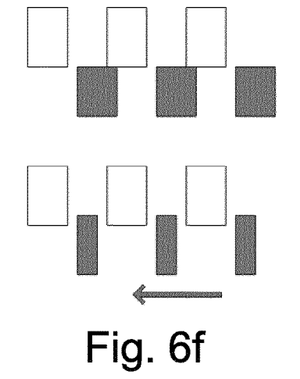
Figure 6G:
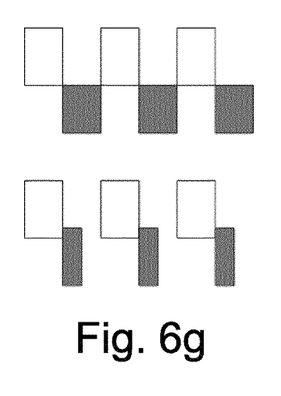
Figure 6H:
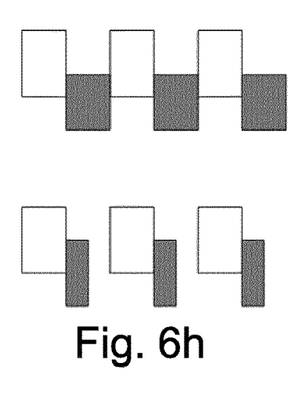
Figure 6I:
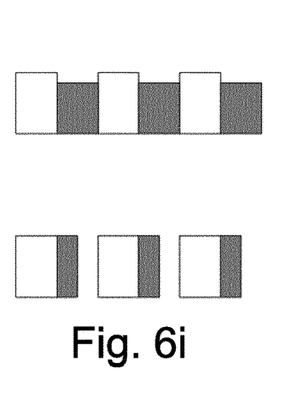

In FIG. 5c, the splines of the spline row 185 have been aligned with the splines of the spline row 195, meaning that it is possible for the ends of the splines 185 to enter the space between the splines 195. This is done in FIG. 5d. In FIG. 5e, the ends of the splines of the spline row 195 has contacted the splines 185, hence forcing the spline row 185 to corotate with the spline row 185. This will allow for the splines of the spline row 180 to mate with the splines of spline row 190 (FIGS. 5f and 5g).

In case the rotational speeds of the spline rows 180, 185 and 190, 195, respectively, are the opposite, the connection sequence will be equal to the connection sequence as disclosed in conjunction with FIGS. 4a-4h, i.e. a reverse of the transferred torque will be required for the splines to come into complete contact. For the second embodiment, this is shown in FIGS. 6a to 6i.

According to the invention, a dog clutch allowing for both "clonk" free connection and connection of the dog clutch also when there is a difference of the rotational speeds of the drive shaft of the dog clutch is provided.

The invention claimed is:

1. A dog clutch comprising first and second drive shafts, the drive shafts being connectable to one another by a dual spline connector which is movable along a longitudinal axis of the first and second drive shafts and provided with an internal spline that mates with an external spline of the first drive shaft, the dual spline connector further being provided with an external spline that upon axial movement may be connected or disconnected to an internal spline of the second drive shaft, wherein either or both of the external spline of the dual spline connector and/or the internal spline of the second drive shaft is or are provided with a recess provided at an end of the spline that is arranged to contact a mating spline for allowing partial connection of the internal and external splines, wherein the recess is placed on a side of the spline being opposite to a side of the spline intended to transfer torque in a main direction and comprises a torque transferring surface with a shape corresponding to the spline the torque transferring surface is arranged to contact and having a bottom surface that is flat and perpendicular to a rotational axis of the dual spline connector.

* * * * *